US 12,494,980 B2

United States Patent
Oh et al.

(10) Patent No.: US 12,494,980 B2
(45) Date of Patent: Dec. 9, 2025

(54) TARGET PERFORMANCE BASED METHOD OF UPDATING POLICIES FOR SOFTWARE-DEFINED NETWORKING OF ELECTRONIC DEVICE

(71) Applicants: AGENCY FOR DEFENSE DEVELOPMENT, Daejeon (KR); AJOU UNIVERSITY INDUSTRY-ACADEMIC COOPERATION FOUNDATION, Suwon-si (KR)

(72) Inventors: Sangyoon Oh, Suwon-si (KR); Byeong Hee Roh, Suwon-si (KR); Dae Gun Yoon, Suwon-si (KR); Cheol Woong Lee, Suwon-si (KR); Kyung Woo Kim, Daejeon (KR)

(73) Assignees: AGENCY FOR DEFENSE DEVELOPMENT, Daejeon (KR); AJOU UNIVERSTIY INDUSTRY-ACADEMIC COOPORATION FOUNDATION, Suwon-si (KR)

( * ) Notice: Subject to any disclaimer, the term of this patent is extended or adjusted under 35 U.S.C. 154(b) by 379 days.

(21) Appl. No.: 17/957,174

(22) Filed: Sep. 30, 2022

(65) Prior Publication Data
US 2023/0231791 A1    Jul. 20, 2023

(30) Foreign Application Priority Data
Jan. 17, 2022    (KR) .......................... 10-2022-0006572

(51) Int. Cl.
*H04L 43/0882*    (2022.01)
*G06N 3/045*    (2023.01)
(Continued)

(52) U.S. Cl.
CPC ......... *H04L 43/0882* (2013.01); *G06N 3/045* (2023.01); *H04L 41/16* (2013.01);
(Continued)

(58) Field of Classification Search
CPC ..... H04L 41/16; H04L 43/04; H04L 43/0882; H04L 45/08; H04L 45/76; G06N 3/045
See application file for complete search history.

(56) References Cited

U.S. PATENT DOCUMENTS

2008/0310303 A1    12/2008    Wang et al.
2009/0190471 A1    7/2009    Mahendran et al.
(Continued)

FOREIGN PATENT DOCUMENTS

KR    10-2010-0112158 A    10/2010
KR    10-2014-0116552 A    10/2014
(Continued)

OTHER PUBLICATIONS

Linear combination—Wikipedia, retrieved from https://en.wikipedia.org/w/index.php?title=Linear_combination&oldid=1032445744 (Year: 2021).*
(Continued)

*Primary Examiner* — Ayaz R Sheikh
*Assistant Examiner* — Christopher R Davis
(74) *Attorney, Agent, or Firm* — MILES & STOCKBRIDGE P.C.

(57) ABSTRACT

An electronic device and a method of improving a performance of a software-defined networking (SDN) of the electronic device are provided. The method includes: identifying at least one policy from a flow table of the software-defined networking; identifying performance index parameters based on information about the at least one policy; determining whether or not an improvement in the performance of the software-defined networking is required based
(Continued)

on the performance index parameters and a target performance index; when the improvement in the performance of the software-defined networking is determined to be required, executing a predetermined algorithm based on information about the performance index parameters to check execution information about the at least one policy; and updating the at least one policy based on the execution information.

7 Claims, 8 Drawing Sheets

(51) Int. Cl.
  *H04L 41/16* (2022.01)
  *H04L 41/40* (2022.01)
  *H04L 43/04* (2022.01)
  *H04L 45/00* (2022.01)
  *H04L 45/02* (2022.01)
  *H04L 45/76* (2022.01)
(52) U.S. Cl.
  CPC .............. *H04L 41/40* (2022.05); *H04L 43/04* (2013.01); *H04L 45/08* (2013.01); *H04L 45/14* (2013.01); *H04L 45/76* (2022.05)

(56) References Cited

U.S. PATENT DOCUMENTS

2018/0359172 A1* 12/2018 Yadav ................. H04L 41/5045
2020/0136957 A1* 4/2020 Sanchez Charles .. H04L 45/124
2020/0344154 A1* 10/2020 Ying ..................... H04L 45/124

FOREIGN PATENT DOCUMENTS

| KR | 10-2016-0041631 A | 4/2016 |
| KR | 10-2018-0057475 A | 5/2018 |
| KR | 10-1984478 B1 | 9/2019 |
| KR | 10-2020-0002439 A | 1/2020 |
| KR | 10-2021-0016802 A | 2/2021 |

OTHER PUBLICATIONS

Multiplicative inverse—Wikipedia, retrieved from https://en.wikipedia.org/w/index.php?title=Multiplicative_inverse&oldid=1049614713 (Year: 2021).*
Outline of statistics—Wikipedia, Statistics—Wikipedia, retrieved from https://en.wikipedia.org/w/index.php?title=Outline_of_statistics&oldid=1028670514 and https://en.wikipedia.org/w/index.php?title=Statistics&oldid=1059998245 (Year: 2021).*
Multilayer perceptron—Wikipedia, retrieved from https://en.wikipedia.org/w/index.php?title=Multilayer_perceptron&oldid=1065161984 (Year: 2022).*
A Comprehensive Guide to Data Preprocessing, retrieved from https://web.archive.org/web/20210924005608/https://neptune.ai/blog/data-preprocessing-guide (Year: 2021).*
Vijay Varadharajan et al., "A Policy-Based Security Architecture for Software-Defined Networks", IEEE Transactions on Information Forensics and Security, vol. 14, No. 4, Apr. 2019.
International Search Report in corresponding Application No. PCT/KR2022/014764 dated Apr. 7, 2023.

* cited by examiner

```
{
    "flow_id" : 3,
    "dst_ip" : 210.*,
    "action" : drop
}
```

TARGET PERFORMANCE BASED METHOD OF UPDATING POLICIES FOR SOFTWARE-DEFINED NETWORKING OF ELECTRONIC DEVICE

CROSS-REFERENCE TO RELATED APPLICATION(S)

This application claims the benefit of Korean Patent Application No. 10-2022-0006572, filed on Jan. 17, 2022, in the Korean Intellectual Property Office, the disclosure of which is incorporated herein by reference.

BACKGROUND

1. Field of the Invention

The embodiments of the present disclosure generally relate to improving performance of software-defined networking (SDN) of an electronic device.

2. Description of the Related Art

In order to efficiently transmit a significant amount of data that is distributed in various services of a network, a packet with such data needs to quickly arrive at its destination. To do this, a routing path, through which the data is transmitted from an origin node to a destination node via switches constituting a hardware level of the network, needs to be optimized. However, such a simple optimization of the routing path may cause concentration of the data transmission on links connecting specific switches, which makes it difficult to efficiently use the overall bandwidth of the network. Therefore, by optimizing the routing path through which data is transmitted, the links are used in a distributed manner to prevent the data transmission from being saturated on a specific link while reducing a length of the average routing path.

A software-defined networking (SDN) is a technology for managing the switches. In the SDN, a control plane (hereinafter referred to as "CP") and a data plane (hereinafter referred to as "DP") of each switch are used conceptually as distinct, each switch plays a role of DP and a controller of the SDN, which plays a role of CP, is additionally provided. Unlike a network in the related art in which all switches are directly managed, the SDN collectively manages the switches using its controller. Therefore, the SDN is very convenient to apply to the switches through a change of network policies. Accordingly, by modifying packet routing policies using the SDN, it is possible to adjust a routing path and conveniently manage a utilization rate of each link.

Even though the network policies can be simply changed and applied to the switches by using a controller of the SDN, it is very difficult to analyze and determine how to modify the network policies to improve over network performance. Such an analysis process may be performed by a human. However, this is inefficient and lacks versatility for application to various platforms. Therefore, there is a need for a solution capable of the analysis process to increase work efficiency, and easily increasing versatility for application to various platforms by independently operating in a lower-level network structure.

SUMMARY

An aspect provides an electronic device which includes a processor for executing a method described in the present disclosure and is capable of improving a performance of a software-defined networking (SDN) by updating a policy of the SDN by an algorithm.

Technical matters to be achieved in the present disclosure are not limited to the technical matters described above, and other technical matters will be inferred from the following example embodiments.

According to an aspect, there is provided a method of improving a performance of a software-defined networking of an electronic device, the method may include: identifying at least one policy from a flow table of the software-defined networking; identifying performance index parameters based on information about the at least one policy; determining whether or not an improvement in the performance of the software-defined networking is required based on the performance index parameters and a target performance index; when the improvement in the performance of the software-defined networking is determined to be required, executing a predetermined algorithm based on information about the performance index parameters to check execution information about the at least one policy; and updating the at least one policy based on the execution information.

According to another aspect, there is provided an electronic device that may include: a memory in which at least one program is stored; and a processor configured to execute the at least one program to: check at least one policy from a flow table of a software-defined networking; check performance index parameters based on information about the at least one policy; determine whether or not an improvement in a performance of the software-defined networking is required based on the performance index parameters and a target performance index; when the improvement in the performance of the software-defined networking is determined to be required, execute a predetermined algorithm based on information about the performance index parameters to check execution information about the at least one policy; and update the at least one policy based on the execution information.

According to an aspect, there is provided a computer-readable recording medium may include a non-transitory recording medium that records a program for causing a computer to execute the operations described above.

Specific details of other example embodiments are included in the detailed description and the drawings.

According to an aspect, by automating a process of analyzing and determining how to modify network policies of a software-defined networking (SDN) to improve overall network performance, work efficiency can be increased. Further, the method can be independently executed regardless of a lower-level network structure, which makes it possible to be easily applied to various platforms with high versatility.

Effects are not limited to the aforementioned effects, and other effects not mentioned will be clearly understood by those skilled in the art from the description of the claims.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 6 illustrates an example embodiment of execution information according to the present disclosure;

DETAILED DESCRIPTION

Figure 1:
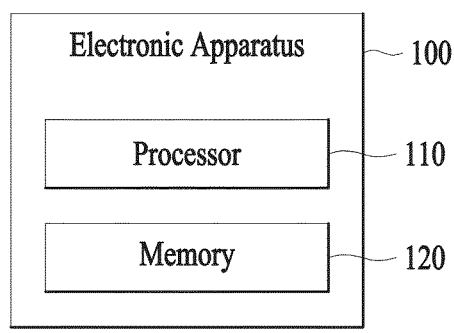
FIG. 1 illustrates an electronic device according to the present disclosure.

Example embodiments of a technology described herein are not intended to limit the scope of the present disclosure but are merely examples. Those skilled in the art may design various alternative example embodiments without departing the scope of the present disclosure defined by the appended claims. Terms used in example embodiments are general terms that are currently widely used while their respective functions in the present disclosure are taken into consideration. However, the terms may be changed depending on the intention of one of ordinary skilled in the art, legal precedents, emergence of new technologies, and the like. Also, in particular cases, terms that are arbitrarily selected by the applicant of the present disclosure may be used. In this case, the meanings of these terms may be described in detail in the corresponding disclosure. Accordingly, the terms used herein should be defined based on the meanings thereof and the content throughout the specification, rather than a simple name of the term.

Unless otherwise specified, the term "policy" or "flow" used herein means a packet delivery rule recorded in a flow table of a software-defined networking (SDN). The policy may include one or more fields such as a packet matching field, a priority field, a processing command field, and the like.

Unless otherwise specified, the term "performance index" used herein means a parameter or the like indicating the performance of the SDN. The performance index may be a parameter that is well known in the technical field, and may be a parameter defined by a user.

Unless otherwise specified, the term "target performance index" used herein means a target value corresponding to the performance index of the SDN.

Unless otherwise specified, the term "performance index parameter" used herein means an element used as a basis to calculate the performance index. The performance index parameter may be calculated based on information stored in the flow table. For example, the performance index parameter may be an average of the number of hops relating to each policy stored in the flow table. Examples of the performance index parameter will be described in detail below.

Unless otherwise specified, the term "execution information" used herein means information including a method of modifying at least one policy stored in the flow table. Examples of the execution information will be described in detail below.

Expressions in the singular form used herein should be understood to encompass expressions in the plural form unless the context clearly indicates otherwise.

When a part "includes" a constituent element(s) or an operation(s) through the specification, this means that the part is not intended to necessarily include all the constituent element(s) or the operation(s), and may further include other constituent elements, rather than excluding constituent elements other than those described in the claims and the specification, unless other specified.

Further, although the terms including ordinal numbers such as a first, a second and the like used herein may be used to describe various constituent elements, such constituent elements should not be limited by terms including the ordinal numbers. The above terms may be used to distinguish a constituent element from another constituent element in a description of the specification in context. For example, a first constituent element may be named as a second constituent element in another description of the specification without departing from the scope of the present disclosure. Conversely, the second constituent element may be named as the first constituent element in another description of the specification.

The terms "mechanism," "element," "means," and "configuration" used herein may be used broadly and are not limited to mechanical or physical embodiments. These terms may include meaning of a series of routines of software in association with a processor.

In this specification (in particular, the claims), the word "above" and similar directives may be used to include the singular form or the plural form. In addition, when the word "range" is described herein, the range may be understood to include individual values in the range (unless otherwise specified). In the detailed description, each individual value constituting the range may be understood to be merely described. In addition, respective operations constituting a method described herein may not be necessarily performed in the order of the respective operations, but may be performed while being rearranged in a suitable sequence unless the context clearly dictates a specific sequence, or unless otherwise specified. Further, all examples or exemplary terms (for example, "and (or) the like") may be used for the purpose of merely specifically describing the technical spirit and the scope of the present disclosure is not limited to the above examples or exemplary terms unless they are limited by the claims. Those skilled in the art may add various modification, combinations and variations to example embodiments described in this specification according to design conditions and factors, and may implement another example embodiments that fall within the scope of the claims or the range of equivalents thereof.

Example embodiments of the present disclosure will be described below with reference to the drawings.

FIG. 1 illustrates a simplified exemplary block diagram of an electronic device 100 that may be used to implement at least one example embodiment of the present disclosure. In various example embodiments, the electronic device 100 may be used to implement any system or method described in the present disclosure. For example, the electronic device 100 may be configured to be used as any electronic device including a data server, a web server, a portable computing device, a personal computer, a tablet computer, a workstation, a mobile phone, a smart phone, or any other device described below.

The electronic device 100 may include a memory 120, and one or more processors 110 provided with one or more cache memories and memory controllers which may be configured to communicate with the memory 120. Further, the electronic device 100 may include other devices that may be connected to the electronic device 100 via one or more ports (for example, a universal serial bus (USB), a headphone jack, a lightening connector, a thunderbolt connector, and the like). The device that may be connected to the electronic device 100 may include a plurality of ports configured to receive a fiber optic connector.

The configuration of the electronic device 100 illustrated herein may be considered merely as a specific example for the purpose of illustrating preferred example embodiments of the device. Thus, As will be understood by those skilled in the art, in addition to the constituent elements included in the electronic device 100, other general-purpose constituent elements may be further included in the electronic device 100.

The processor 110 may be used to cause the electronic device 100 to provide operations or functions in an example embodiment described in the present disclosure. For example, the processor 110 executes programs stored in the memory 120 of the electronic device 100 to control the overall operation of the electronic device 100. The processor 110 may be implemented with a central processing unit (CPU), a graphics processing unit (GPU), an application processor (AP), and the like, but not limited thereto.

The memory 120 is hardware for storing various pieces of data processed in the electronic device 100. The memory 120 may store pieces of data processed and to be processed by the processor 110 of the electronic device 100. Further, the memory 120 may store not only a basic programming and a data structure that is configured to provide the functionality of at least one example embodiment of the present disclosure but also applications (programs, code modules, instructions), drivers, and the like that are configured to the functionalities of example embodiments of the present disclosure. The memory 120 may include a random-access memory (RAM) such as a dynamic random-access memory (DRAM), a static random-access memory (SRAM) or the like, a read-only memory (ROM), an electrically erasable programmable read-only memory (EEPROM), a compact disc read-only memory (CD-ROM), a Blu-ray or other optical disk storage, a hard disk drive (HDD), a solid-state drive (SSD), or a flash memory.

Figure 2:
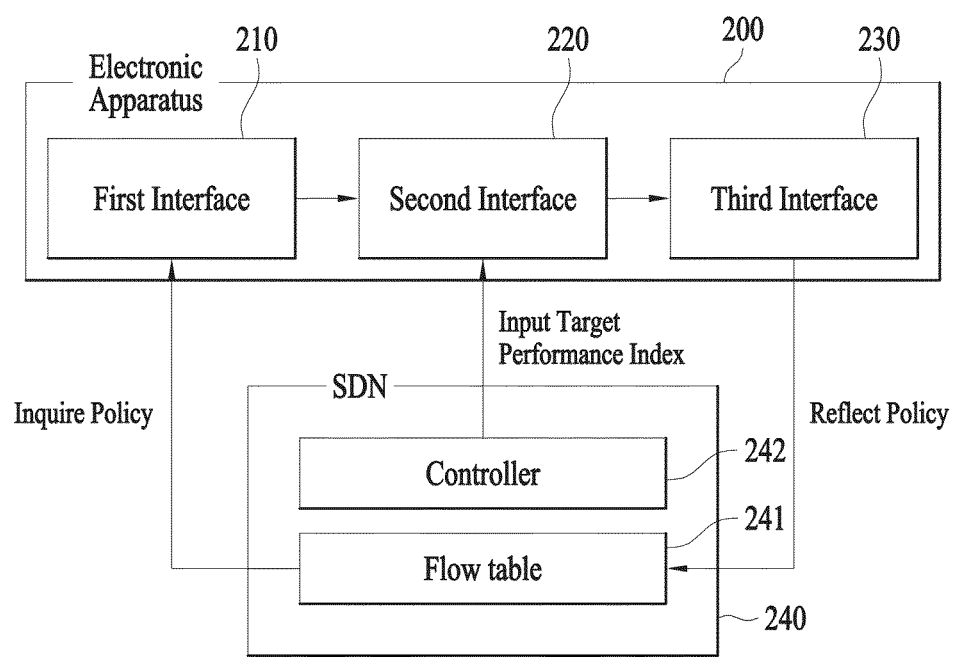
FIG. 2 illustrates a relationship between the electronic device according to the present disclosure and a software-defined networking (SDN)

FIG. 2 illustrates example embodiments of an electronic device 200 and a software-defined networking (SDN) according to the present disclosure. The electronic device 200 illustrated in FIG. 2 and the electronic device 100 illustrated in FIG. 1 are to be construed as non-exclusive. The electronic device 200 may include the electronic device 100, or the electronic device 100 may include the electronic device 200. In an example embodiment, the electronic device 200 may check at least one policy from a flow table 241 of the SDN 240, check a performance index parameter based on information about the at least one policy, and based on the performance index parameter and a target performance index, determine whether or not performance improvement of the SDN 240 is required. When the result of the determination is that the performance improvement of the SDN 240 is required, the electronic device 200 may execute a predetermined algorithm based on information about the performance index parameter to check execution information about the at least one execution policy, and may update the at least one policy based on the execution information.

Specifically, the electronic device 200 may check or inquire the at least one policy from the flow table 241 of the SDN 240 via a first interface 210, check the performance index parameter via the first interface 210 based on the information about the at least one policy, and based on the performance index parameter and the target performance index checked from a controller 242 of the SDN 240, determine whether or not the performance improvement of the SDN 240 is required via a second interface 220. When the result of the determination is that the performance improvement of the SDN 240 is required, the electronic device 200 may execute a predetermined algorithm via the second interface 220 based on the information about the performance index parameter to check execution information about the at least one policy, and may update the at least one policy via a third interface 230 based on the execution information.

In an example embodiment, each of the first interface 210, the second interface 220 and the third interface 230 of the electronic device 200 may be separate electronic devices. For example, the first interface 210 may include a first processor, the second interface 220 may include a second processor, and the third interface 230 may include a third processor. In this case, the first processor of the first interface 210 may execute a program stored in the memory to check or inquire the at least one policy and check the performance index parameter based on the information about the at least one policy. The second processor of the second interface 220 may execute a program stored in the memory to determine whether or not the performance improvement of the SDN 240 is required based on the performance index parameter and the target performance index checked from the controller 242 of the SDN 240. When the result of the determination is that the performance improvement of the SDN 240 is required, the second processor of the second interface 220 may execute a predetermined algorithm based on information about the performance index parameter to check execution information about the at least one policy. The third processor of the third interface 230 may execute a program stored in the memory and update the at least one policy based on the execution information. In this case, the first interface 210, the second interface 220 and the third interface 230 may share the memory. Each of the first interface 210, the second interface 220 and the third interface 230 may read out its input data from the shared memory, and may write its output data on the shared memory. This offers the advantage of being able to process the method according to the present disclosure in a distribute manner.

In an example embodiment, the first interface 210, the second interface 220 and the third interface 230 of the electronic device 200 may be logically distinct modules, respectively. In this case, the processor of the electronic device 200 may execute the program stored in the memory to check the at least one policy from the flow table 241 of the SDN 240 and check the performance index parameter based on the information about the at least one policy. The processor of the electronic device 200 may determine whether or not the performance improvement of the SDN 240 is required based on the performance index parameter and the target performance index. When the result of the determination is that the performance improvement of the SDN 240 is required, the processor of the electronic device 200 may execute a predetermined algorithm based on information about the performance index parameter to check execution information about the at least one policy and update the at least one policy based on the execution information. This eliminates the need to provide the respective processors of the first interface 210, the second interface 220 and the third interface 230.

In an example embodiment, two of the first interface 210, the second interface 220, and the third interface 230 may be logically distinct modules in one electronic device, and the remaining one may be another electronic device distinct from the one electronic device.

Figure 3:
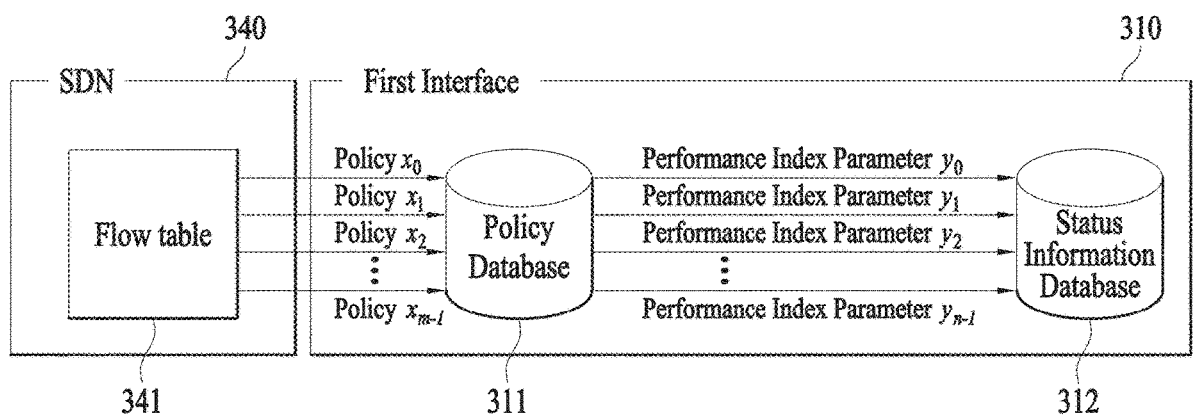
FIG. 3 illustrates an example embodiment of a first interface according to the present disclosure.

FIG. 3 illustrates an example embodiment of a first interface 310 according to the present disclosure. In an example embodiment, the processor 110 may check at least one policy from a flow table 341 of an SDN 340 via the first interface 310, and check a performance index parameter based on information about the at least one policy. Specifically, the processor 110 may check m policies $x_0, x_1, \ldots, x_{m-1}$ from the flow table 341 of the SDN 340 via the first interface 310, store the same in a policy database 311, check n performance index parameters $y_0, y_1, \ldots y_{n-1}$ based on information about the m policies $x_0, x_1, \ldots, x_{m-1}$ stored in the policy database 311, and store the n performance index parameters $y_0, y_1, \ldots, y_{n-1}$ in a state information database 312. Herein, m and n may be different numbers.

The performance index parameters may include a longest routing distance, an average routing distance, a routing distance variance, a maximum link utilization rate, an average link utilization rate, a link utilization rate variance, and the like. Specifically, each of the n performance index parameters $y_0, y_1, \ldots, y_{n-1}$ may be any one of the longest routing distance, the average routing distance, the routing distance variance, the maximum link utilization rate, the average link utilization rate, and the link utilization rate variance.

In an example embodiment, the processor 110 may check the longest routing distance, the average routing distance, and the routing distance variance based on a routing distance of each of the at least one policy, and check the maximum link utilization rate, the average link utilization rate, and the link utilization rate variance based on a link utilization rate of each of at least one link included in a network topology.

For example, the routing distance may be represented by the number of hops of a routing path. The longest routing distance M[D], which means the longest routing distance among the routing distances of the m policies, may be calculated by the following mathematical formula.

$$M[D] = \max(D_j) \quad \text{[Mathematical formula 1]}$$

In Mathematical formula 1 above, j is a natural number in a range of 1 or more and m or less, and $D_j$ means a routing distance of a j-th policy.

The average routing distance E[D], which means the average of the routing distances of the m policies, may be calculated by the following mathematical formula.

$$E[D] = \frac{\sum_{j=1}^{m} D_j}{m} \quad \text{[Mathematical formula 2]}$$

In Mathematical formula 2 above, j is the natural number in the range of 1 or more and m or less, and $D_j$ means the routing distance of the j-th policy.

The routing distance variance Var[D], which means a variance of the routing distances of the m policies, may be calculated by the following mathematical formula.

$$\text{Var}[D] = \frac{\sum_{j=1}^{m}(D_j - E[D])^2}{m} \quad \text{[Mathematical formula 3]}$$

In Mathematical formula 3 above, j is the natural number in a range of 1 or more and m or less, and $D_j$ and E[D] mean the routing distance and the average routing distance of the j-th policy, respectively.

For example, the maximum link utilization rate M[U], which means the largest utilization rate among utilization rates of l links, may be calculated by the following mathematical formula.

$$M[U] = \max(U_i) \quad \text{[Mathematical formula 4]}$$

In Mathematical formula 4 above, i is a natural number in a range of 1 or more and l or less, and $U_i$ means a link utilization rate of an i-th link.

The average link utilization rate E[U], which means the average of the utilization rates of the l links, may be calculated by the following mathematical formula.

$$E[U] = \frac{\sum_{i=1}^{l} U_i}{l} \quad \text{[Mathematical formula 5]}$$

In Mathematical formula 5 above, i is the natural number in the range of 1 or more and l or less, and $U_i$ means the link utilization rate of the i-th link.

The link utilization rate variance Var[U], which means the variance of a utilization rate of each of the l links, may be calculated by the following mathematical formula.

$$\text{Var}[U] = \frac{\sum_{i=1}^{l}(U_i - E[U])^2}{l} \quad \text{[Mathematical formula 6]}$$

In Mathematical formula 6 above, i is the natural number in the range of 1 or more and l or less, and $U_i$ and E[U] mean the link utilization rate and the average link utilization rate of the i-th link, respectively.

Figure 4:
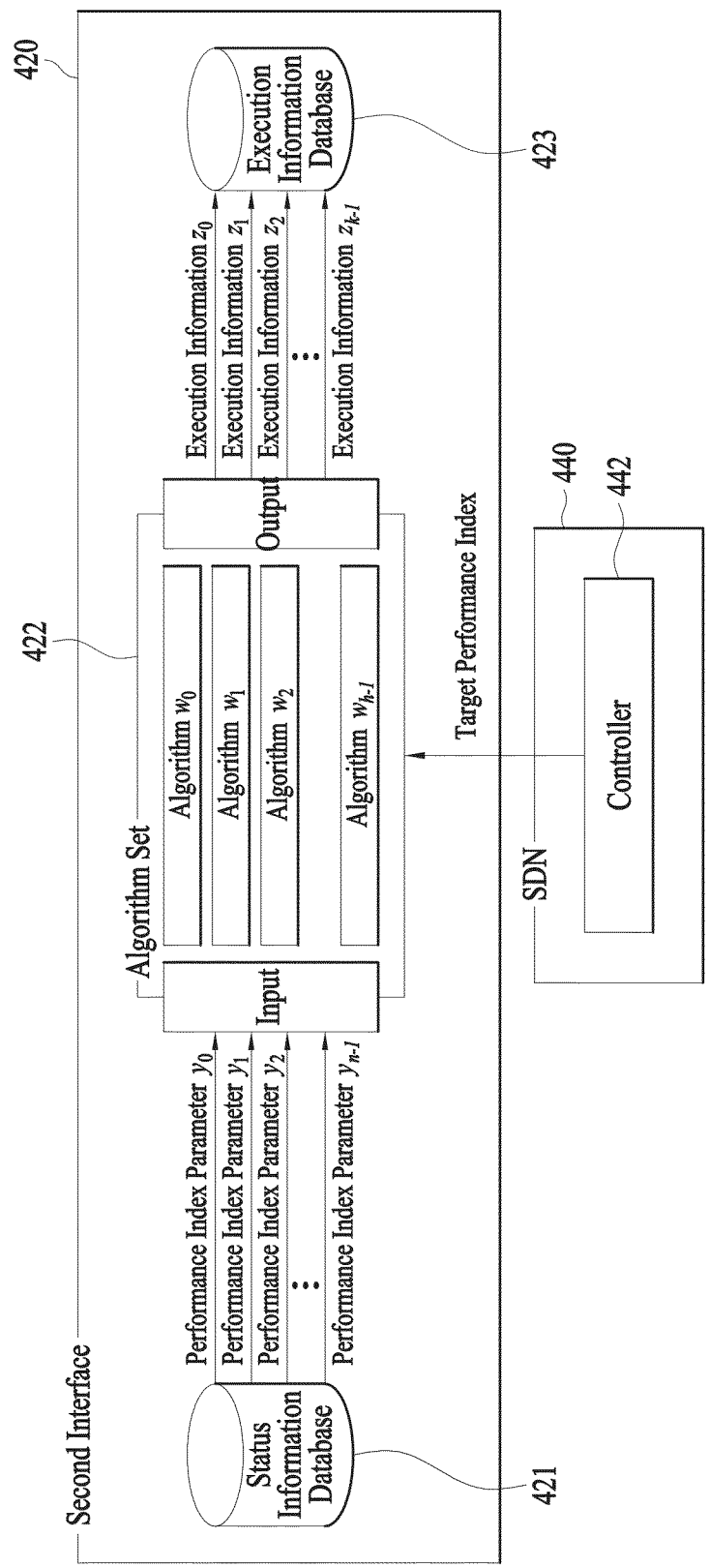
FIG. 4 illustrates an example embodiment of a second interface according to the present disclosure.

FIG. 4 illustrates an example embodiment of a second interface 420 according to the present disclosure. In an example embodiment, the processor 110 may determine whether or not a performance improvement of an SDN 440 is required based on a performance index parameter and a target performance index checked from a controller 442 of the SDN 440 via the second interface 420. When the result of the determination is that the performance improvement of the SDN 440 is required, the processor 110 may execute a predetermined algorithm based on information about the performance index parameter to check execution information about at least one policy. In this case, the processor 110 may check the target performance index from the controller 442 of the SDN 440. Alternatively, the processor 110 may check at least one algorithm included in an algorithm set 422 from the controller 442 of the SDN 440. Specifically, based on n performance index parameters $y_0, y_1, \ldots m\ y_{n-1}$ stored in a state information database 421 and the target performance index checked from the controller 442 of the SDN 340, the processor 110 may determine whether or not the performance improvement of the SDN 440 is required via the second interface 420. When the result of the determination is that the performance improvement of the SDN 440 is required, the processor 110 may execute h algorithms $w_0, w_1, \ldots, w_{h-1}$ based on information about the n performance index parameters $y_0, y_1, \ldots, y_{n-1}$ to check k pieces of execution information $z_0, z_1, \ldots, z_{k-1}$, and store the k pieces of execution information in an execution information database 423. Herein n, h and k may be different numbers.

Specifically, the processor 110 may check the performance index using a preset formula based on the performance index parameter. More specifically, the processor 110 may confirm, as the performance index, a linear combination of respective reciprocals of the performance index parameters. For example, a performance index P may be calculated by the following mathematical formula.

$$P = \frac{k_1}{\text{Var}[U]} + \frac{k_2}{M[U]} + \frac{k_3}{M[D]} + \frac{k_4}{E[D]} \quad \text{[Mathematical formula 7]}$$

In Mathematical formula 7 above, $k_1$ to $k_4$ are coefficients of respective terms, and Var[U], M[U], M[D], and E[D] mean the link utilization rate variance, the maximum link utilization rate, the maximum routing distance, and the average routing distance, respectively. It is seen from Mathematical formula 7 above that the larger the values of Var[U], M[U], M[D], or E[D], the smaller the value of the performance index P. In other words, it is seen that the larger the value of the performance index P defined in Mathematical formula above, the better the performance of the SDN.

$k_1$ to $k_4$ may be relative reflection ratios of respective performance indexes. For example, $k_1$ may be 1,000, and each of $k_2$, $k_3$ and $k_4$ may be 250. In this case, $k_1$, which is the numerator of Var[U], is larger than the remaining $k_2$, $k_3$, $k_4$, and the like. Thus, $k_1$ may have a significant influence on the performance index P compared to the remaining performance index parameters having different link utilization rate variances. The values of $k_1$ to $k_4$ are not limited to the above but may be freely determined in advance according to a user's intention.

In an example embodiment, the performance index P may be obtained using a method different from that using the above-described mathematical formulas. The performance index P may be represented by a linear combination of reciprocals of the values of two or more of the n performance index parameters $y_0, y_1, \ldots, y_{n-1}$, as well as the longest routing distance, the average routing distance, the routing distance variance, the maximum link utilization rate, the average link utilization rate and the link utilization rate variance, or the like. Alternatively, the performance index P may be calculated by a function or mathematical formula other than the linear combination.

In an example embodiment, the processor 110 may determine whether or not a difference between the performance index and the target performance index exceeds a preset value to determine whether or not the performance improvement of the SDN is required. The target performance index may be provided from the controller 442 of the SDN 440. For example, when it is determined that the difference between the performance index and the target performance index does not exceed the preset value, the processor 110 may determine that the performance index of the SDN 440 reaches the target performance index, and may not execute an additional performance improvement task or generate execution information indicating that no fluctuation occurs in the flow table. In contrast, when it is determined that the difference between the performance index and the target performance index exceeds the preset value, the processor 110 may determine that the performance index of the SDN 440 does not reach the target performance index, and may execute a predetermined algorithm based on information about the performance index parameter to check execute information about the at least one policy.

The algorithm set 422 may include one or more algorithms. The processor 110 may execute the respective algorithms included in the algorithm set 422 in a series fashion or in a parallel fashion based on the information about the performance index parameter via the second interface to check the execution information about the at least one policy. Each algorithm may include at least one output. The at least one output of each algorithm may correspond to the execution information.

Figure 5:
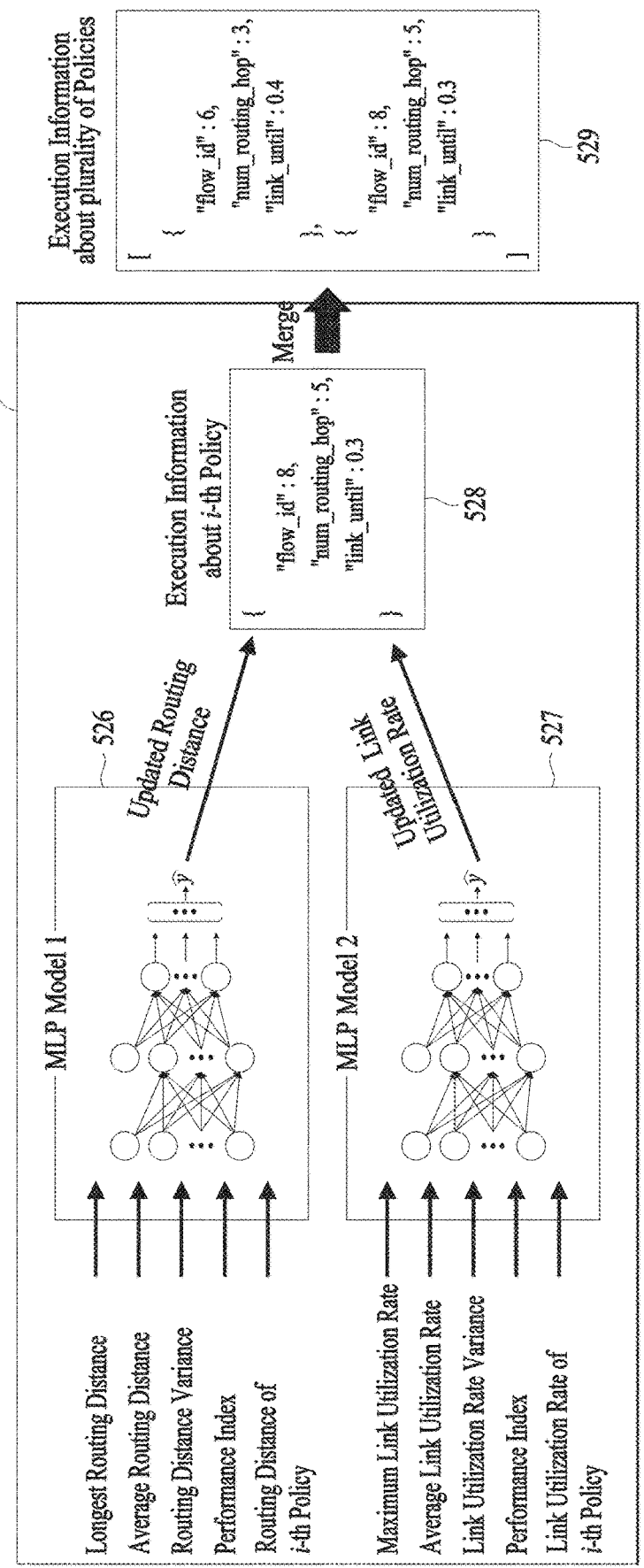
FIG. 5 illustrates an example embodiment of an algorithm according to the present disclosure.

In an example embodiment, the algorithm may include a pre-trained artificial neural network. The processor 110 may check the execution information based on an output of the pre-trained artificial neural network to which the information about the performance index parameter is input. Specifically, the processor 110 may execute the pre-trained artificial neural network so as to check a first updated routing distance of a first policy based on the longest routing distance, the average routing distance, the routing distance variance, the performance index and a first routing distance of the first policy, and check a first updated link utilization rate of the first policy based on the maximum link utilization rate, the average link utilization rate, the link utilization rate variance, the performance index and a first link utilization rate of the first policy. FIG. 5 illustrates an example embodiment of such an algorithm.

Specifically, an algorithm 525 may include a pre-trained artificial neural network. The pre-trained artificial neural network may include a first multilayer perception (MLP) model 526 that is trained to receive and process the longest routing distance, the average routing distance, the routing distance variance, the performance index and a routing distance of one policy, and output a collected routing distance relating to the one policy. For example, the processor 110 may execute the pre-trained artificial neural network or the first MLP model 526 based on the longest routing distance, the average routing distance, the routing distance variance, the performance index and a routing distance of an i-th policy to check a updated routing distance of the i-th policy. In an example embodiment, the updated routing distance of the i-th policy may be shorter than the routing distance of the i-th policy. In another example embodiment, the first MLP model 526 may be trained to receive and process routing distances of a plurality of policies instead of the routing distance of one policy, and output collected routing distances relating to the plurality of policies.

The pre-trained artificial neural network may include a second MLP model 527 that is trained to receive and process the maximum link utilization rate, the average link utilization rate, the link utilization rate variance, the performance index and a link utilization rate of one policy, and output a updated link utilization rate relating to the one policy. For example, the processor 110 may execute the pre-trained artificial neural network or the second MLP model 527 based on the maximum link utilization rate, the average link utilization rate, the link utilization rate variance, the performance index and a link utilization rate of an i-th policy, and check a updated link utilization rate of the i-th policy. In an example embodiment, the updated link utilization rate of the i-th policy may be less than the link utilization rate of the i-th policy. In another example embodiment, the second MLP model 527 may be trained to receive and process link utilization rates of a plurality of policies instead of the link utilization rate of one link policy, and output a plurality of updated link utilization rates relating to the plurality of policies. As will be understood by those skilled in the art, the pre-trained artificial neural network may include any other trainable artificial neural networks instead of the first MLP model 526 and the second MLP model 527.

In an example embodiment, the processor 110 may generate first execution information about the first policy based on the first updated routing distance and the first updated link utilization rate. Specifically, the processor 110 may merge the first updated routing distance and the first updated link utilization rate to generate the first execution information about the first policy. For example, as illustrated in FIG. 5, the processor 110 may merge the updated routing distance of the i-th policy and the updated link utilization rate of the i-th policy to generate execution information 528 about the i-th policy. In this case, the execution information 528 about the i-th policy may include a policy's identifier field (flow_id), a policy's updated routing distance field (num_routing_hop) and a policy's updated link utilization rate field (link_util). For example, the field "flow_id" of the execution information 528 is 8. Thus, the execution information 528 may mean that the policy has an identifier of 8. When the execution information 528 is reflected in the flow table of the SDN, the policy having the identifier of 8 may be reconfigured such that the policy's updated routing distance field (num_routing_hop) satisfies 5 and the policy's updated link utilization rate field (link_util) satisfies 0.3.

In an example embodiment, the processor 110 may execute the pre-trained artificial neural network to: check a plurality of updated routing distances of the plurality of policies based on the longest routing distance, the average routing distance, the routing distance variance, the performance index and a routing distance of each of the plurality of policies; check a plurality of updated link utilization rates of the plurality of policies based on the maximum link utilization rate, the average link utilization rate, the link utilization rate variance, the performance index and a link utilization rate of each of the plurality of policies; generate a plurality of pieces of partial execution information about the plurality of policies based on the plurality of updated routing distances and the plurality of updated link utilization rates; and merge the plurality of pieces of partial execution information. For example, the processor 110 may merge partial execution information of a first policy, partial execution information of a second policy, . . . , partial execution information of an m-th policy to generate execution information 529 about the plurality of policies. The execution information 529 about the plurality of policies may have a pattern in which pieces of execution information about an i-th policy are arranged. The processor 110 may parse the execution information 529 about the plurality of policies to check individual execution information about each policy included in the plurality of policies.

Figure 6:
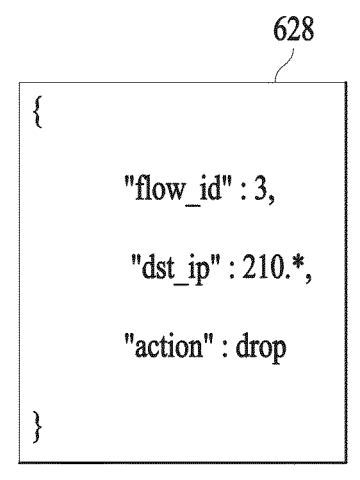

FIG. 6 illustrates an example embodiment of execution information 628 according to the present disclosure. In an example embodiment, the execution information 628 may include at least one of a policy's identifier field (flow_id), a policy's origin ip field (src_ip), a policy's destination ip address field (dst_ip), a policy's processing command field (action). For example, as illustrated in FIG. 6, the field "flow_ip" of the execution information 628 is 3. Thus, the execution information 628 may mean that the policy has an identifier of 3. When the execution information 628 is reflected in the flow table of the SDN, the policy having the identifier of 3 may be reconfigured as a rule in which an action is to drop all packets whose policy's destination ip address (dst_ip) starts with 210.

Figure 7:
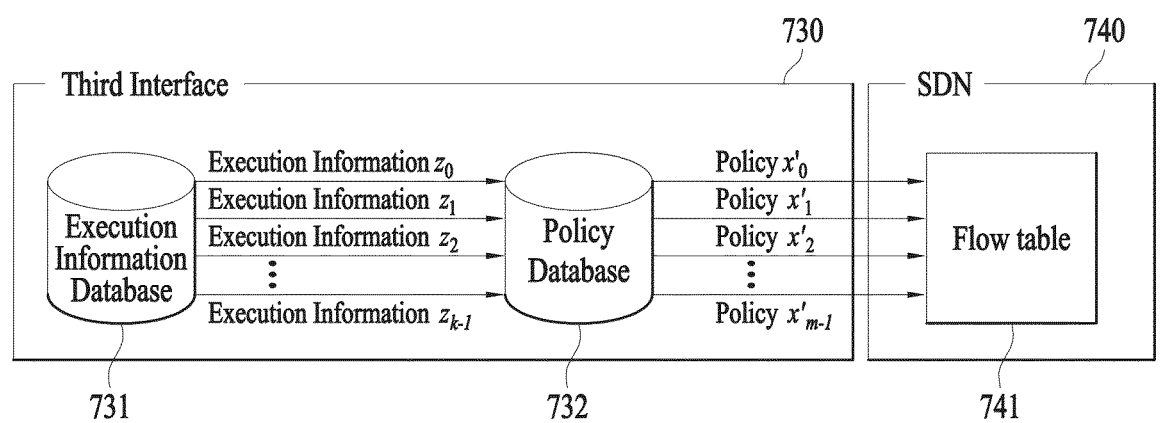
FIG. 7 illustrates an example embodiment of a third interface according to the present disclosure.

FIG. 7 illustrates an example embodiment of a third interface 730 according to the present disclosure. In an example embodiment, the processor 110 may update at least one policy via the third interface 730 based on the execution information. Specifically, via the third interface 730, the processor 110 may update m policies $x_0, x_1, \ldots, x_{m-1}$ stored in a policy database 732 based on k pieces of execution information $z_0, z_1, \ldots, z_{k-1}$ stored in an execution information database 731, and store updated m policies $x'_0, x'_1, \ldots, x'_{m-1}$ in a flow table 741 of an SDN 740. Herein, k and m may be different numbers. In another example embodiment, the SDN 740 may receive the k pieces of execution information $(z_0, z_1, \ldots, z_{k-1})$ from the processor 110, update the m policies $x_0, x_1, \ldots, x_{m-1}$ stored in the flow table 741 based on the received execution information, and store updated m policies $x'_0, x'_1, \ldots, x'_{m-1}$ in the flow table 741.

In an example embodiment, the policy database, the status information database, and the execution information database described above may be separate physical memories, or may be logically distinct memories. This allows the access to each database from the outside of the electronic device and the check of information stored in the respective database.

In an example embodiment, each of the first interface, the second interface and the third interface may include a separate communication module which enables transmission/reception of data to/from each other. In this case, each of the first interface, the second interface and the third interface may directly communicate with each other to perform the transmission/reception of the data without storing its output in a separate database.

Figure 8:
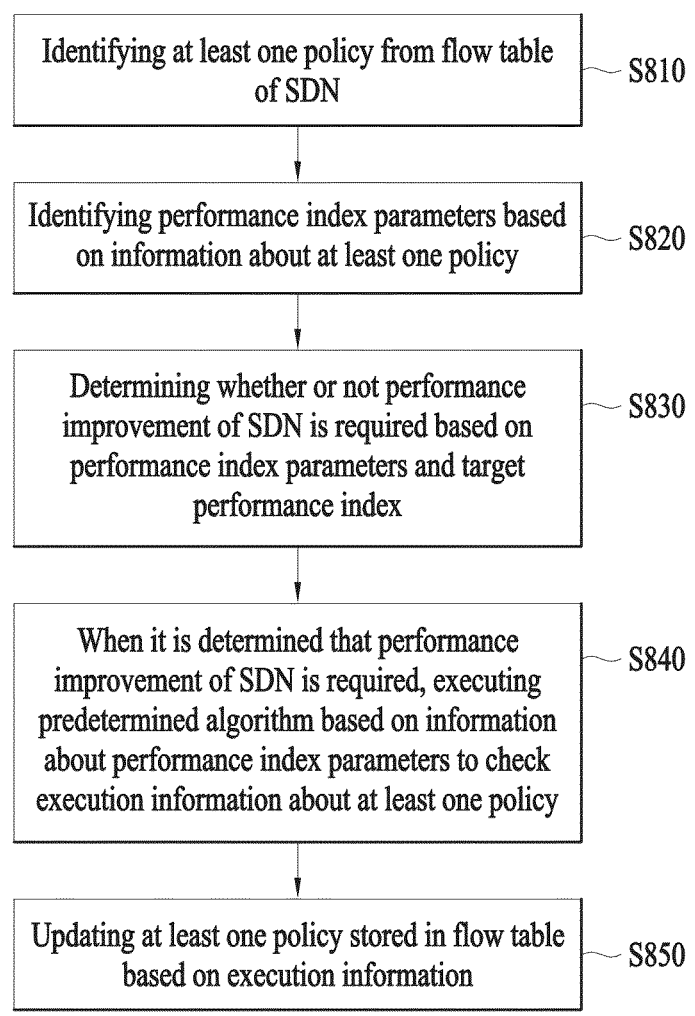
FIG. 8 illustrates an example embodiment of a method according to the present disclosure.

FIG. 8 illustrates a method of operating the electronic device 100 according to an example embodiment. Each operation of the method of FIG. 8 may be performed by the electronic device 100 illustrated in FIG. 1, and thus description of the contexts that overlap with those described with reference to FIG. 1 will be omitted.

In step S810, the electronic device 100 may check at least one policy from the flow table of the SDN.

The electronic device 100 may store the at least one policy in a policy database.

In step S820, the electronic device 100 may check performance index parameters based on information about the at least one policy.

The electronic device 100 may check a longest routing distance, an average routing distance, and a routing distance variance based on a routing distance of each of the at least one policy, and check a maximum link utilization rate, an average link utilization rate, and a link utilization rate variance based on a link utilization rate of each of at least one link included in a network topology.

The electronic device 100 may store the performance index parameters in a status information database.

In step S830, the electronic device 100 may determine whether or not a performance improvement of the SDN is required based on the performance index parameters and a target performance index.

The electronic device 100 may check a performance index using a mathematical formula set in advance based on the performance index parameters, and determine whether or not a difference between the performance index and the target performance index exceeds a preset value. Through such a determination, the electronic device 100 may determine whether or not the performance improvement of the SDN is required.

The electronic device 100 may confirm, as the performance index, a linear combination of respective reciprocals of the performance index parameters.

The electronic device 100 may check the target performance index from the controller of the SDN.

In step S840, when it is determined that the performance improvement of the SDN is required, the electronic device 100 may execute a predetermined algorithm based on information about the performance index parameters to check execution information about the at least one policy.

The algorithm may include a pre-trained artificial neural network. The electronic device 100 may check the execution information through an output of the pre-trained artificial neural network to which the information about the performance index parameters is input.

The electronic device 100 may execute the pre-trained artificial neural network to: check a first updated routing distance of a first policy based on the longest routing distance, the average routing distance, the routing distance variance, the performance index and a first routing distance of the first policy; check a first updated link utilization rate of the first policy based on the maximum link utilization rate, the average link utilization rate, the link utilization rate variance, the performance index and a first link utilization rate of the first policy; and generate first execution information about the first policy based on the first updated routing distance and the first updated link utilization rate.

The pre-trained artificial neural network may include a first MLP model that is trained to receive and process the longest routing distance, the average routing distance, the routing distance variance, the performance index and a routing distance of one policy so as to output a updated routing distance relating to the one policy, and a second MLP model that is trained to receive and process the maximum link utilization rate, the average link utilization rate, the link utilization rate variance, the performance index and a link utilization rate of the one policy so as to output a updated link utilization rate relating to the one policy.

The electronic device 100 may store the execution information in an execution information database.

In step S850, the electronic device 100 may update the at least one policy stored in the flow table based on the execution information.

The electronic device 100 may update the policy stored in the policy database based on the execution information, and store the updated policy in the flow table.

The embodiments according to the present disclosure as described above may be implemented in the form of program commands that can be executed by various computer components, and may be recorded on a computer-readable recording medium or a non-transitory computer-readable recording medium recording a program for causing a computer to execute the method of claim 1 transitory recording medium. The computer-readable recording medium or the non-transitory recording medium may include program commands, data files, and data structures, independently or in combination. The program commands recorded on the computer-readable recording medium may be specially designed and configured for the present disclosure, or may also be well known and available to and by those skilled in the computer software field. Examples of the computer-readable recording medium or the non-transitory recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program commands include not only machine language codes created by a compiler, but also high-level language codes that can be executed by a computer using an interpreter. The above hardware devices may be changed to one or more software modules to perform the processes of the present disclosure, and vice versa.

The present embodiments may be described in terms of functional block components and various processing steps. Such functional blocks may be realized by any number of hardware, software or a combination thereof configured to perform specified functions. For example, embodiments may employ various integrated circuit (IC) components, for example, memory elements, processing elements, logic elements, look-up tables, and the like, which may carry out a variety of functions under the control of one or more microprocessors or other control devices. Similarly, where the constituent elements are implemented using software programming or software elements, the present embodiments may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the embodiments described herein may employ techniques in the related art for electronics configuration, signal processing, data processing, a combination thereof, and the like.

What is claimed is:

1. A method of improving a performance of a software-defined networking of an electronic device, the method comprising:
    identifying at least one policy from a flow table of the software-defined networking;
    identifying performance index parameters based on information about the at least one policy;
    determining whether or not an improvement in the performance of the software-defined networking is required based on the performance index parameters and a target performance index;
    when the improvement in the performance of the software-defined networking is determined to be required, executing a predetermined algorithm based on information about the performance index parameters to identify execution information about the at least one policy; and
    updating the at least one policy based on the execution information,
    wherein the identifying of the performance index parameters includes identifying a longest routing distance, an average routing distance, and a routing distance variance based on a routing distance of each of the at least one policy, and identifying a maximum link utilization rate, an average link utilization rate, and a link utilization rate variance based on a link utilization rate of each of at least one link included in a network topology,
    wherein the determining of whether or not the improvement in the performance of the software-defined networking is required includes identifying a performance index using a preset mathematical formula based on the performance index parameters,
    wherein the predetermined algorithm includes a pre-trained artificial neural network,
    wherein the identifying of the execution information includes identifying the execution information through an output of the pre-trained artificial neural network to which the information about the performance index parameters is input, wherein the identifying of the execution information includes:

executing the pre-trained artificial neural network to: identify a first updated routing distance of a first policy of the at least one policy based on the longest routing distance, the average routing distance, the routing distance variance, the performance index and a first routing distance of the first policy; and identify a first updated link utilization rate of the first policy based on the maximum link utilization rate, the average link utilization rate, the link utilization rate variance, the performance index and a first link utilization rate of the first policy; and generating first execution information about the first policy based on the first updated routing distance and the first updated link utilization rate, wherein the pre-trained artificial neural network includes:

a first multilayer perception model trained to receive and process a longest routing distance, an average routing distance, a routing distance variance, a performance index and a routing distance of a policy so as to output a collected routing distance relating to the policy; and a second multilayer perception model trained to receive and process a maximum link utilization rate, an average link utilization rate, a link utilization rate variance, a performance index and a link utilization rate of the policy so as to output a updated link utilization rate relating to the policy, wherein the determining of whether or not the improvement in the performance of the software-defined networking is required includes:

determining the improvement in the performance of the software-defined networking is required when a difference between the performance index and the target performance index exceeds a preset value; and determining the improvement in the performance of the software-defined networking is not required when the difference does not exceed the preset value, wherein the identifying of the performance index includes: identifying, as the performance index, a linear combination of respective reciprocals of the maximum link utilization rate, the link utilization rate variance, the longest routing distance and the average routing distance, wherein the preset mathematical formula is $$P = \frac{k_1}{\operatorname{Var}[U]} + \frac{k_2}{M[U]} + \frac{k_3}{M[D]} + \frac{k_4}{E[D]},$$

wherein, in the preset mathematical formula, P corresponds to the performance index, Var[U] corresponds to the link utilization rate variance, M[U] corresponds to the maximum link utilization rate, M[D] corresponds to the longest routing distance, E[D] corresponds to the average routing distance, and k1 to k4 correspond to coefficients of respective terms, Var[U], M[U], M[D] and E[D], wherein the at least one policy is a packet delivery rule recorded in the flow table of the software-defined networking, wherein the execution information includes modifying the at least one policy, wherein the generating first execution information about the first policy includes:

generating the first execution information by merging the first updated routing distance and the first updated link utilization rate, wherein the first execution information includes one or more of the first policy's identifier field, the first policy's updated routing distance field, the first policy's updated link utilization rate field, the first policy's origin ip field, the first policy's destination ip field and the first policy's processing command field, wherein the first policy is updated to satisfy a value of one or more fields included in the first execution information, when the first execution information is reflected in the flow table.

2. The method of claim 1, wherein the determining of whether or not the improvement in the performance of the software-defined networking is required includes: identifying the target performance index from a controller of the software-defined networking.

3. The method of claim 1, wherein the identifying of the at least one policy includes storing the at least one policy in a policy database, the identifying of the performance index parameters includes storing the performance index parameters in a status information database, the identifying of the execution information includes storing the execution information in an execution information database, and updating the at least one policy includes updating the at least one policy stored in the policy database based on the execution information, and storing an updated policy in the flow table.

4. An electronic device comprising, a memory in which at least one program is stored; and a processor configured to execute the at least one program to:

identify at least one policy from a flow table of a software-defined networking;

identify performance index parameters based on information about the at least one policy;

determine whether or not an improvement in a performance of the software-defined networking is required based on the performance index parameters and a target performance index;

when the improvement in the performance of the software-defined networking is determined to be required, execute a predetermined algorithm based on information about the performance index parameters to identify execution information about the at least one policy; and update the at least one policy based on the execution information, wherein the predetermined algorithm includes a pre-trained artificial neural network, wherein the processor configured to:

identify performance index parameters by identifying a longest routing distance, an average routing distance, and a routing distance variance based on a routing distance of each of the at least one policy, and identifying a maximum link utilization rate, an average link utilization rate, and a link utilization rate variance based on a link utilization rate of each of at least one link included in a network topology, determine whether or not the improvement in the performance of the software-defined networking is required by identifying a performance index using a preset mathematical formula based on the performance index parameters, identify the execution information by identifying the execution information through an output of the pre-trained artificial neural network to which the information about the performance index parameters is input, identify the execution information by:

executing the pre-trained artificial neural network to: identify a first updated routing distance of a first policy of the at least one policy based on the longest routing distance, the average routing distance, the routing distance variance, the performance index and a first routing distance of the first policy; and identify a first updated link utilization rate of the first policy based on the maximum link utilization rate, the average link utilization rate, the link utilization rate variance, the performance index and a first link utilization rate of the first policy; and generating first execution information about the first policy based on the first updated routing distance and the first updated link utilization rate, wherein the pre-trained artificial neural network includes:

a first multilayer perception model trained to receive and process a longest routing distance, an average routing distance, a routing distance variance, a performance index and a routing distance of a policy so as to output a collected routing distance relating to the policy; and a second multilayer perception model trained to receive and process a maximum link utilization rate, an average link utilization rate, a link utilization rate variance, a performance index and a link utilization rate of the policy so as to output a updated link utilization rate relating to the policy, wherein the processor configured to:

determine whether or not the improvement in the performance of the software-defined networking is required by:

determining the improvement in the performance of the software-defined networking is required when a difference between the performance index and the target performance index exceeds a preset value; and determining the improvement in the performance of the software-defined networking is not required when the difference does not exceed the preset value, identify the performance index by:

identifying, as the performance index, a linear combination of respective reciprocals of the maximum link utilization rate, the link utilization rate variance, the longest routing distance and the average routing distance, wherein the preset mathematical formula is $$P = \frac{k_1}{\text{Var}[U]} + \frac{k_2}{M[U]} + \frac{k_3}{M[D]} + \frac{k_4}{E[D]},$$

wherein, in the preset mathematical formula, P corresponds to the performance index, Var[U] corresponds to the link utilization rate variance, M[U] corresponds to the maximum link utilization rate, M[D] corresponds to the longest routing distance, E[D] corresponds to the average routing distance, and k1 to k4 correspond to coefficients of respective terms, Var[U], M[U], M[D] and E[D], wherein the at least one policy is a packet delivery rule recorded in the flow table of the software-defined networking, wherein the execution information includes modifying the at least one policy, wherein the processor configured to:

generate first execution information about the first policy by merging the first updated routing distance and the first updated link utilization rate, wherein the first execution information includes one or more of the first policy's identifier field, the first policy's updated routing distance field, the first policy's updated link utilization rate field, the first policy's origin ip field, the first policy's destination ip field and the first policy's processing command field, wherein the first policy is updated to satisfy a value of one or more fields included in the first execution information, when the first execution information is reflected in the flow table.

5. A non-transitory computer-readable medium storing instructions for causing a computer to execute a method of improving a performance of a software-defined networking of an electronic device, the instructions comprising:

identifying at least one policy from a flow table of the software-defined networking; identifying performance index parameters based on information about the at least one policy;

determining whether or not an improvement in the performance of the software-defined networking is required based on the performance index parameters and a target performance index;

when the improvement in the performance of the software-defined networking is determined to be required, executing a predetermined algorithm based on information about the performance index parameters to identify execution information about the at least one policy; and updating the at least one policy based on the execution information, wherein the identifying of the performance index parameters includes identifying a longest routing distance, an average routing distance, and a routing distance variance based on a routing distance of each of the at least one policy, and identifying a maximum link utilization rate, an average link utilization rate, and a link utilization rate variance based on a link utilization rate of each of at least one link included in a network topology, wherein the determining of whether or not the improvement in the performance of the software-defined networking is required includes identifying a performance index using a preset mathematical formula based on the performance index parameters, wherein the predetermined algorithm includes a pre-trained artificial neural network, wherein the identifying of the execution information includes identifying the execution information through an output of the pre-trained artificial neural network to which the information about the performance index parameters is input, wherein the identifying of the execution information includes:

executing the pre-trained artificial neural network to: identify a first updated routing distance of a first policy of the at least one policy based on the longest routing distance, the average routing distance, the routing distance variance, the performance index and a first routing distance of the first policy; and identify a first updated link utilization rate of the first policy based on the maximum link utilization rate, the average link utilization rate, the link utilization rate variance, the performance index and a first link utilization rate of the first policy; and generating first execution information about the first policy based on the first updated routing distance and the first updated link utilization rate, wherein the pre-trained artificial neural network includes:

a first multilayer perception model trained to receive and process a longest routing distance, an average routing distance, a routing distance variance, a performance index and a routing distance of a policy so as to output a collected routing distance relating to the policy; and a second multilayer perception model trained to receive and process a maximum link utilization rate, an average link utilization rate, a link utilization rate variance, a performance index and a link utilization rate of the policy so as to output a updated link utilization rate relating to the policy, wherein the determining of whether or not the improvement in the performance of the software-defined networking is required includes:

determining the improvement in the performance of the software-defined networking is required when a difference between the performance index and the target performance index exceeds a preset value; and determining the improvement in the performance of the software-defined networking is not required when the difference does not exceed the preset value, wherein the identifying of the performance index includes: identifying, as the performance index, a linear combination of respective reciprocals of the maximum link utilization rate, the link utilization rate variance, the longest routing distance and the average routing distance, wherein the preset mathematical formula is $$P = \frac{k_1}{Var[U]} + \frac{k_2}{M[U]} + \frac{k_3}{M[D]} + \frac{k_4}{E[D]},$$

wherein, in the preset mathematical formula, P corresponds to the performance index, Var[U] corresponds to the link utilization rate variance, M[U] corresponds to the maximum link utilization rate, M[D] corresponds to the longest routing distance, E[D] corresponds to the average routing distance, and k1 to k4 correspond to coefficients of respective terms, Var[U], M[U], M[D] and E[D], wherein the at least one policy is a packet delivery rule recorded in the flow table of the software-defined networking, wherein the execution information includes modifying the at least one policy, wherein the generating first execution information about the first policy includes: generating the first execution information by merging the first updated routing distance and the first updated link utilization rate, wherein the first execution information includes one or more of the first policy's identifier field, the first policy's updated routing distance field, the first policy's updated link utilization rate field, the first policy's origin ip field, the first policy's destination ip field and the first policy's processing command field, wherein the first policy is updated to satisfy a value of one or more fields included in the first execution information, when the first execution information is reflected in the flow table.

6. The non-transitory computer-readable of claim 5, wherein the determining of whether or not the improvement in the performance of the software-defined networking is required includes: identifying the target performance index from a controller of the software-defined networking.

7. The non-transitory computer-readable of claim 5, wherein the identifying of the at least one policy includes storing the at least one policy in a policy database, the identifying of the performance index parameters includes storing the performance index parameters in a status information database, the identifying of the execution information includes storing the execution information in an execution information database, and updating the at least one policy includes updating the at least one policy stored in the policy database based on the execution information, and storing an updated policy in the flow table.

* * * * *